United States Patent [19]

Commander et al.

[11] 3,731,177

[45] May 1, 1973

[54] DISC FILE HEAD MOVEMENT CONTROL SYSTEM

[75] Inventors: Robert D. Commander, Eastleigh, England; Jerry D. Dixon, Boca Raton, Fla.

[73] Assignee: International Business Machines Corporation, Armonk, N.Y.

[22] Filed: Dec. 15, 1971

[21] Appl. No.: 208,150

[30] Foreign Application Priority Data

Feb. 15, 1971 Great Britain ..................4,681/71

[52] U.S. Cl. ...................318/603, 318/561, 318/594

[51] Int. Cl. ..............................................G05b 19/28

[58] Field of Search .......................318/603, 692, 594, 318/561

[56] References Cited

UNITED STATES PATENTS 3,411,058 11/1968 Madsen et al. .......................318/696
3,458,785 7/1969 Sordello ..........................318/594 X
3,523,229 8/1970 Black et al. .......................318/603 X
3,659,175 4/1972 Sordello ..............................318/696
3,663,880 5/1972 Gabor .................................318/603

*Primary Examiner*—Benjamin Dobeck
*Attorney*—Edward M. Suden et al.

[57] ABSTRACT

According to the present invention a movement control system comprises a motor for moving said body into a required position, a motor control unit for controlling the acceleration and deceleration of said motor, a position indicator unit producing positioning signals corresponding to movement of said body while accelerating toward said required position, and a calculating unit responsive to position data representing said required position and to said positioning signals to produce a control signal for said motor control unit to change from acceleration to deceleration in order to provide required speed/position characteristics for the movement of said body.

29 Claims, 7 Drawing Figures

INVENTORS.
ROBERT D. COMMANDER
JERRY D. DIXON

BY Edward M. Suden
ATTORNEY

DISC FILE HEAD MOVEMENT CONTROL SYSTEM

BACKGROUND OF THE INVENTION

1. Field of the Invention

The present invention relates to a movement control system for accurately moving a body and has a particular application in the accurate moving of a read/write head relative to a magnetic data storage device, for example, the type generally known as a disc file.

2. Description of the Prior Art

In a storage device of this type items of data are stored by magnetic representations in concentric tracks on a flat disc. In order to read out data from the file or to write data into the file, a read/write head including a suitable transducer is accurately positioned adjacent to the surface of the disc and data transfer takes place. In known forms of disc file the head is moved radially over the disc and for high speed of data transfer it is necessary that the head should be moved quickly and should stop accurately adjacent to the required track.

The head can be moved at a constant speed and a stop routine for the drive motor initiated a predetermined distance from the required track. With such an arrangement movement of the head between tracks a large distance apart takes appreciably longer than movement between tracks placed close together and it is desirable therefore to use a higher speed for longer movements. However since the stop routine must usually be initiated when the head is moving at the low speed, it is necessary to decelerate the head so that its speed is sufficiently reduced for the stop routine to be initiated.

Motor control systems, in particular for stepping motors, often provide for only acceleration and deceleration of the motor and accurate speed control is not obtained. When such a control system and stepping motor are used to position a body such as the read/write head referred to above, if the motor is accelerated when the head starts to move and later decelerated in order to reduce the speed to that required for initiating the stop routine, the length of the required movement of the head will affect the time for acceleration and for deceleration because the maximum speed reached will depend on the characteristics of the system and the length of the required movement.

It will be necessary to change from acceleration to deceleration at the correct position in the path of movement. This can be calculated provided the characteristics of the system and the length of movement are known and the motor controlled accordingly. Known control systems utilizing this principle have involved the previous preparation of a table giving the changeover position for all movements of the head and the "looking up" in the table for each movement. This has necessitated very complicated electrical circuitry.

The object of the present invention is to provide an improved movement control system which has a particular application in the control of the accurate positioning of the read/write head of a magnetic data storage system.

SUMMARY OF THE INVENTION

According to the present invention a movement control system comprises a motor for moving said body into a required position, a motor control unit for controlling the acceleration and deceleration of said motor, a position indicator unit producing positioning signals corresponding to movement of said body while accelerating toward said required position, and a calculating unit responsive to position data representing said required position and to said positioning signals to produce a control signal for said motor control unit to change from acceleration to deceleration in order to provide required speed/position characteristics for the movement of said body.

DESCRIPTION OF THE DRAWINGS

In order that the invention may be more readily understood reference will now be made to the accompanying drawings, in which.

DETAILED DESCRIPTION

Figure 1:
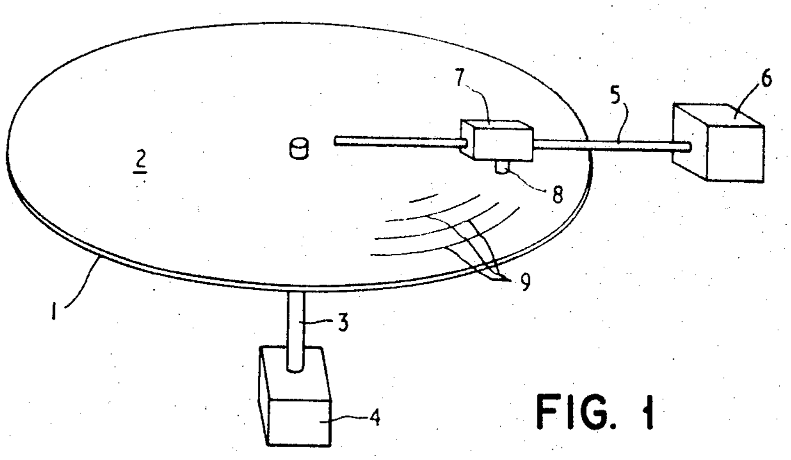
FIG. 1 is a perspective diagrammatic view of a disc file magnetic data storage system with which a movement control system in accordance with the invention may be used.

FIG. 1 illustrates very diagrammatically a disc file magnetic data storage system with which a movement control system in accordance with the invention can be used. The disc file system includes a disc 1 having a layer of magnetizable material 2 on one surface and mounted on a central shaft 3 which can be rotated at a constant speed by a motor 4. A threaded rod 5 extends radially above the surface of the material 2 and is rotatable by a motor 6. Mounted on the rod 5 is a body 7 formed with an internally threaded hole which engages with the thread on the rod 5. Attached to body 7 is a transducer 8 forming a read/write head. Data is recorded on the magnetizable material 2 in a series of tracks 9 all concentric with the shaft 3.

Movement of the body 7 is constrained (by devices not illustrated) so that as the rod 5 is rotated the body 7 and the transducer 8 will move radially over the disc 1 and can be aligned with any selected track 9. The motor 6 includes a position indicating unit which produces pulses corresponds to the movement of the transducer 8 over successive tracks 9 and indicate changes in the position of the transducer.

Figure 2:
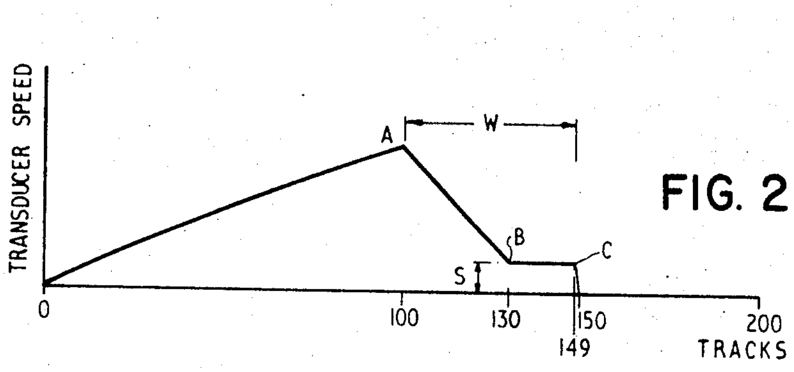
FIG. 2 is a graph illustrating the movement of the read/write head illustrated in FIG. 1 relative to the disc.

FIG. 2 is a graph illustrating the movement of the transducer 8 over the tracks 9. If the transducer is to be moved from track 0 (e.g. the outermost track) to track 150 the rod 5 is accelerated so that the speed of movement of the transducer increases as shown. When the point A at track 100 is reached the acceleration is replaced by a deceleration and the speed drops. At track 130 (B) a predetermined slow speed S is reached and this speed is maintained constant until track 149

(C) is reached. At this point a stop routine is initiated and the transducer is brought to rest accurately at track 150.

The distance W between points A and C will vary with the number of tracks to be crossed. For small numbers of tracks the maximum speed reached at A will be lower than for larger numbers of tracks and a shorter deceleration period (A–B) is needed. The value of W is chosen so that the speed of the transducer is reduced to the level S as close to the point C as possible. This will result in the time of travel being at a minimum. The actual shape of the curve in FIG. 2 will of course depend on the characteristics of the whole system and the value of W for each length of movement can be calculated.

Figure 3:
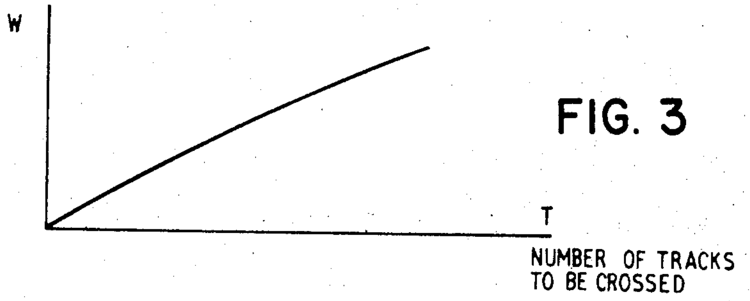
FIG. 3 is a graph illustrating how the instant of changeover from acceleration to deceleration changes with variation in the number of tracks to be crossed by the read/write head.

FIG. 3 illustrates in general form the relationship between W and the number T of tracks to be crossed. While the graph is only diagrammatic it will be noted that the value of W increases more rapidly for low values of T than for high values of T.

A movement control system in accordance with the invention includes circuitry for automatically generating the required value of W for each value of T so that when the transducer receives a command (for example from a Central Processing Unit CPU with which the disc file is being used) to move to a certain track X tracks from the current position the value of W indicating when the acceleration/deceleration should take place is calculated and the correct speed/distance relationship derived.

Figure 4:
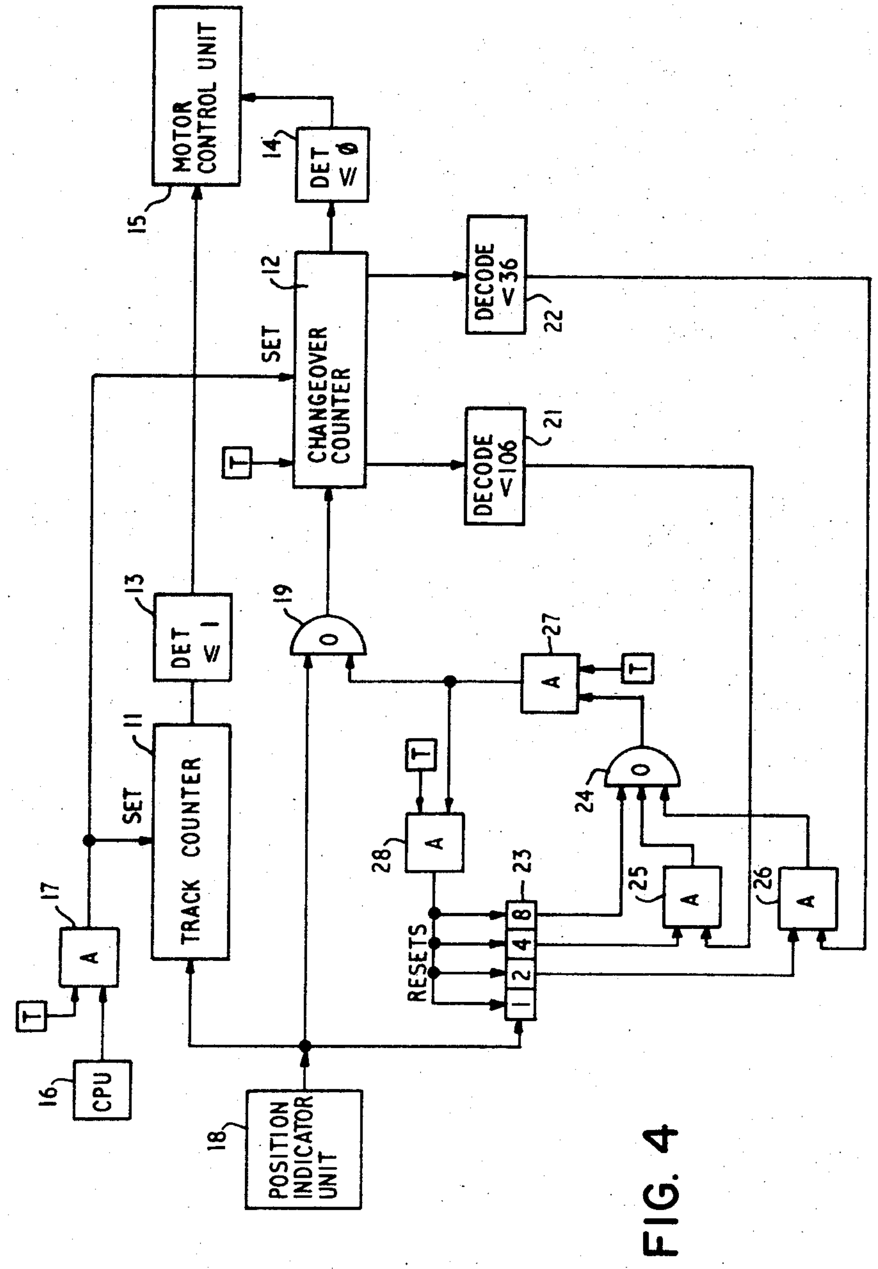
FIG. 4 is a circuit diagram of a movement control system embodying the invention.

FIG. 4 is a circuit diagram of a movement control system which will provide for control as described above. The system includes a Track Counter 11 and a Changeover Counter 12. Two detectors 13, 14 detect a count of one in counter 11 and a count of zero in counter 12 respectively and supply control signals to a Motor Control Unit 15 which unit is used to control a motor for positioning a body such as the read/write head 7 illustrated in FIG. 1. The counters 11, 12 can be loaded with a selected value from a Central Processing Unit 16 through an AND gate 17. The counters 11, 12 can also be decremented by pulses from a Position Indicator Unit 18, the pulses being supplied directly to Counter 11 and through an OR gate 19 to counter 12.

Two Decode units 21, 22 detect selected counts in counter 12 and produce outputs as will be described below. The pulses from unit 18 are also supplied to an auxiliary counter 23 which can count up to 15 and produces an output to an OR gate 24 when its count is 8, produces an output to an AND gate 25 when its output is 4 and produces an output to AND gate 26 when its output is 2. The outputs of decode units 21, 22 are supplied to AND gates 25, 26 respectively. The output of OR gate 24 is supplied to an AND gate 27, the output of which is supplied to OR gate 19 and to an AND gate 28. The output of AND gate 28 is used to reset counter 23. AND gates 17, 27 and 28 and counter 12 are also supplied with timing pulses T, from a source not illustrated.

The system operates as follows when used to control the motor 6 of the disc file illustrated in FIG. 1. An instruction is received from the CPU 16 to move the head 7 together with transducer 8 to a track 9 which is X tracks from the current position. Under the control of a timing pulse T this number X is entered into counters 11 and 12 through AND gate 17. Immediately after entry of number X a value of two is subtracted from the count in Counter 12. This is an optional feature which prevents full operation of the control system if the value of X is two or less. A signal is supplied to motor 6 to initiate rotation of rod 5 and movement of head 7. Position Indicator Unit 18 then starts to produce a pulse each time the head 7 crosses over a track 9. Units 18 can include a disc on the rod 5 which cooperates with an electromagnetic or optical system to produce pulses in synchronism with the rotation of rod 5 and the movement of head 7.

The pulses from unit 18 are supplied to increment counters 11, 12. The pulses are also used to increment counter 23. Decode unit 21 is arranged to produce an output when the count in counter 12 is less than a first predetermined number for example 106, and Decode unit 22 is arranged to produce an output when the count in counter 12 is less than a second predetermined number for example 36.

If, for example, the value of X is 200, initially counter 12 will be set to 198 (200–2) and neither of decode units 21, 22 will supply an output. After eight input pulses counter 23 will produce an output through OR gate 24 to AND gate 27. The next timing pulse T will cause an extra pulse to be supplied through OR gate 19 to counter 12 to decrement the counter 12. This pulse will also be passed through AND gate 28 by the same timing pulse T to reset counter 23 to cause the auxiliary counting sequence to be restarted. Thus an extra decrementing pulse will be supplied to counter 12 every eight tracks crossed by head 7. Counter 12 is therefore decremented at a higher rate than counter 11.

As the count in counter 12 is decremented to less than 106 decode unit 21 produces an output and provides one input to AND gate 25. Therefore when counter 23 counts to 4 a signal will be supplied through AND gate 25 to OR gate 24 and AND gate 27, and the next timing pulse T will cause an extra pulse to be supplied to counter 12 through OR gate 19 and through AND gate 28 to reset counter 23. An additional decrementing pulse will therefore be supplied to counter 12 every four tracks crossed and Counter 12 will be decremented at a still higher rate than counter 11.

As the counter 12 is decremented to less than 36, utilizing AND gate 26 an additional decrementing pulse is supplied to counter 12 every two pulses supplied to and counted by counter 23 and counter 12 is therefore decremented at an even higher rate than counter 11.

From the above it will be appreciated that counters 11 and 12 are initially loaded with the same value X and are decremented by the read/write head 7, but counter 12 is supplied with additional decrementing pulses at a rate dependent on the count in counter 12. The count in counter 12 therefore reaches zero before the count in counter 11.

Figure 5:
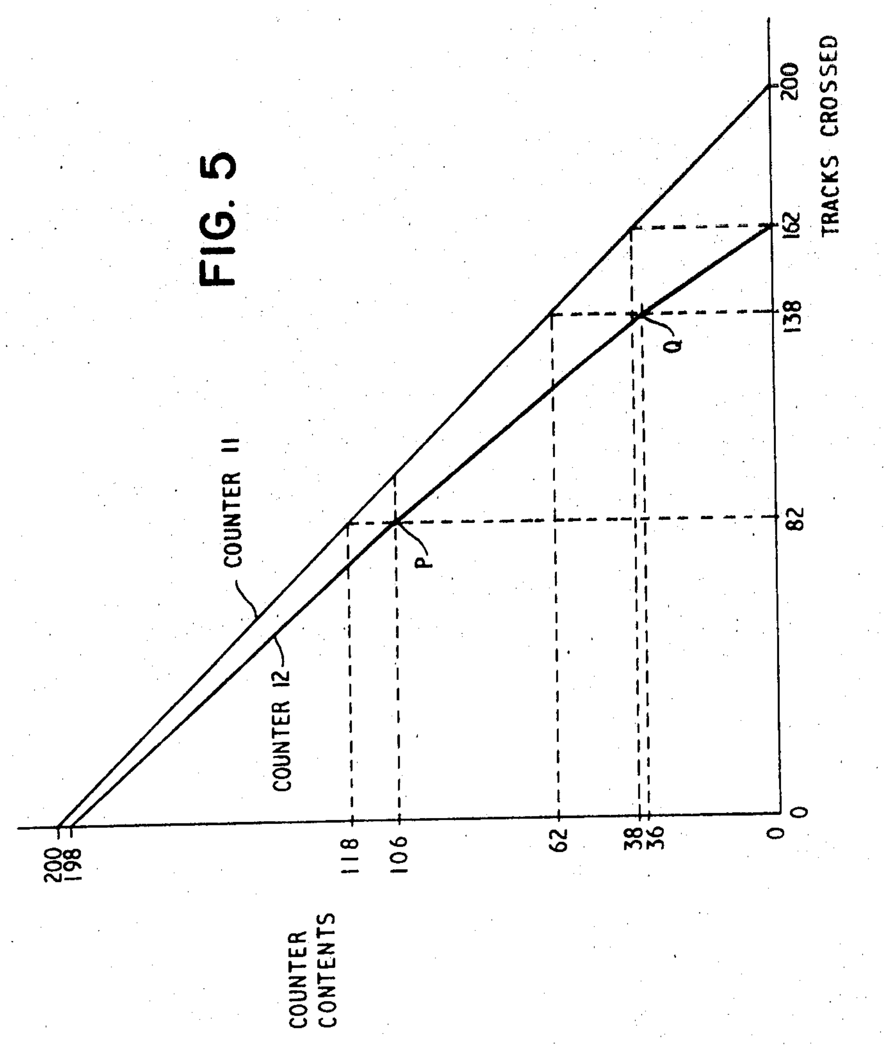
FIG. 5 is a graph illustrating the operation of two of the counters in the system of FIG. 4.

This principle is illustrated in FIG. 5 which is a graph showing the contents of counters 11 and 12 against the number of tracks crossed by the read/write head 7. Counter 11 initially contains a count of 200 (value of X) and is decremented at the steady rate of one for each track 9 crossed. Hence after 200 tracks have been crossed counter 11 reaches a count of zero. Counter 12 is initially loaded to a count of 200 and is subsequently decremented by two to 198 before any movement of rod 5 takes place. Counter 12 is then decremented one for each track crossed with an additional decrementing pulse every eight tracks. After 82 tracks have been crossed counter 12 has received 82 + 10 = 92 pulses and is at a count of 106, point P. For subsequent track crossings counter 12 is decremented one for each track crossing with an additional decrementing pulse every four tracks. After a further 56 tracks have been crossed counter 12 has received a further 56 + 14 = 70 pulses and is at a count of 36, point Q. For the remaining track crossings counter 12 is decremented one for each track crossing with an additional decrementing pulse every two tracks. After a further 24 tracks have been crossed counter 12 has received a further 24 + 12 = 36 pulses and is at a count of zero. At this stage a total of 162 (= 82 + 56 + 24) tracks will have been crossed and counter 11 will be at a count of 38. At point P counter 11 is at a count of 118 and at point Q counter 11 is at a count of 62.

The detectors 13, 14 in FIG. 4 detect one and zero counts in counters 11, 12 respectively and provide control signals to Motor Control Unit 15. The control signal from detector 14 will change the movement of rod 5 from acceleration to deceleration corresponding to point A in FIG. 2 and the control signal from detector 13 will initiate the stop sequence when the penultimate track of the required movement of the read/write head 7 is reached, corresponding to point C in FIG. 2. Point B, between A and C, is reached when the deceleration of the motor 6 and the rod 5 has caused the rod 5 to slow to a speed S which is maintained constant.

It will be appreciated that the rate of decrementing the counter 12 is largely dependent on the decode circuits 21, 22 and the setting of these is predetermined to ensure that for all values of X the point A is reached sufficiently before point C for the rod 5 to decelerate to speed S before point C is reached. This setting clearly depends on the operational characteristics of the motor system.

Using the system illustrated in FIG. 4, when the movement X of 20 tracks is to be performed, when the counters 11, 12 are loaded as described, decode unit 22 will produce an output to AND gate 26 ensuring that an additional decrementing pulse will be supplied to counter 12 for every two tracks crossed. The initial setting of counter 12 will be 18. After 12 tracks have been crossed 18 (= 12 + 6) pulses will have been received by counter 12 and its count will be zero. Point A will have been reached at track 12, 8 tracks before the end of the movement.

If a head movement X of 46 tracks is to be performed, when the counter 11, 12 are loaded as required decode unit 21 will produce an output to AND gate 25 ensuring that an additional decrementing pulse will be supplied to counter 12 for every four tracks crossed. The initial setting of counter 12 will be 44. After four tracks have been crossed an additional pulse will be supplied to decrement counter 12. After a further four tracks have been crossed counter 12 will have a count of 35 and decode unit 22 will produce an output causing an additional decrementing pulse to be supplied to counter 12 for every two tracks crossed for the rest of the movement. Counter 12 will be decremented to zero after 31 tracks have been crossed and therefore point A will have been reached 15 tracks before the end of the movement.

Figure 6:
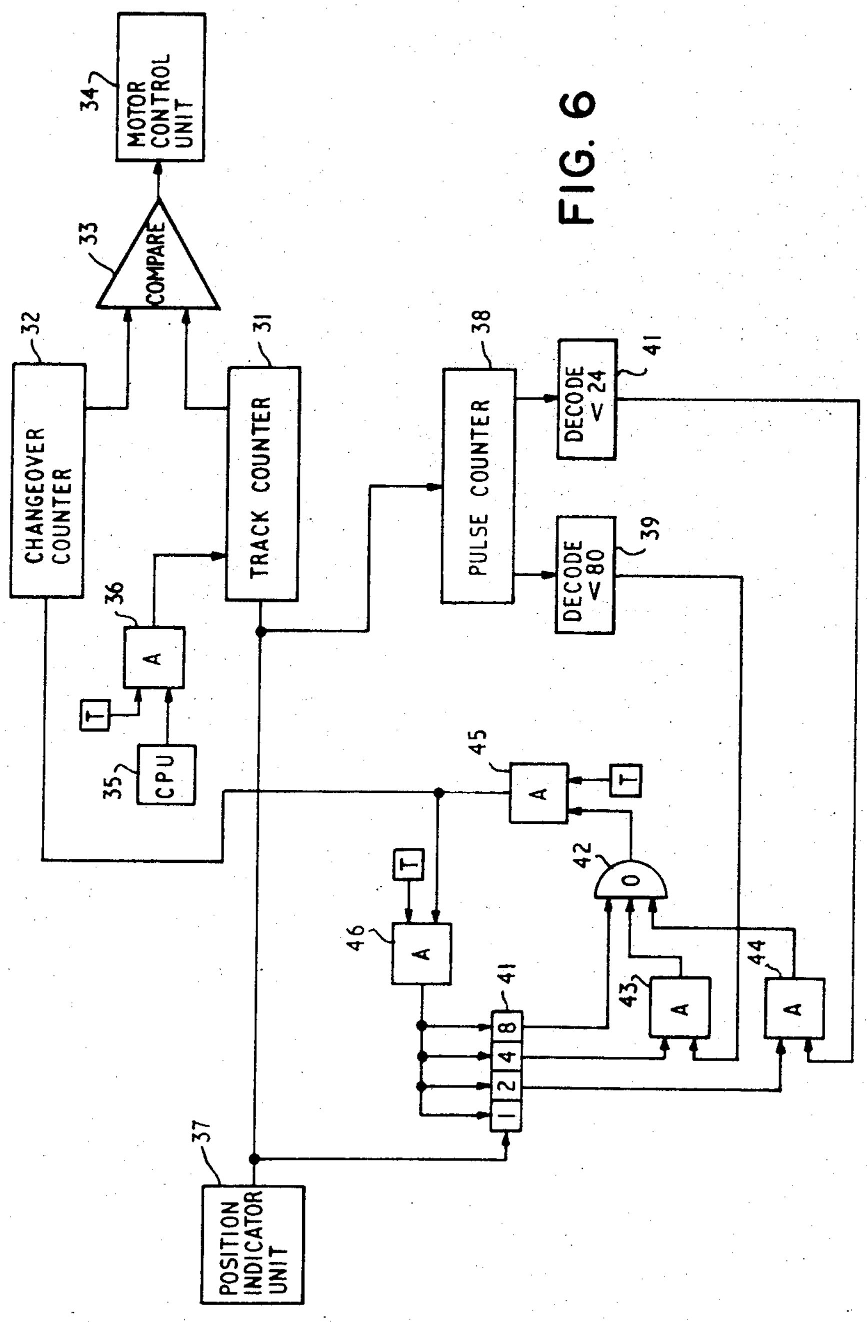
FIG. 6 is a circuit diagram of another movement control system embodying the invention.

FIG. 6 is a circuit diagram of another movement control system which will provide for control of the movement of the read/write head of the disc file as described above. The system includes a Track Counter 31 and a Changeover Counter 32, the contents of which are compared in a Compare Unit 33 having an output supplied to a Motor Control Unit 34 which is used to control the motor 6 in FIG. 1. Track Counter 31 can be loaded with a selected value from a Central Processing Unit 35 through AND gate 36. Counter 31 can also be decremented by pulses from a Position Indicator Unit 37. The pulses from Unit 37 are also supplied to a pulse counter 38 and an auxiliary counter 41. Counter 41 can count up to 15 and produces an output to OR gate 42 when its count is 8, produces an output to AND gate 43 when its count is 4, and produces an output to AND gate 44 when its output is 2. Two decoder units 39, 40 detect selected counts in pulse counter 38 and produce outputs which are supplied to AND gates 43, 44 respectively. The output of OR gate 42 is supplied to AND gate 45, the output of which is supplied to increment Changeover Counter 32 and also to AND Gate 46. The output of AND gate 46 is used to reset counter 41. AND gates 36, 45 and 46 are also supplied with timing pulses T, from a source not illustrated.

The system operates as follows when used to control the motor 6 of the disc file illustrated in FIG. 1. An instruction is received from the CPU 35 to move the head 7 together with the transducer 8 to a track 9 which is X tracks from the current position. Under the control of a timing pulse T this number X entered into counter 31 through AND gate 36. Changeover Counter 32 is also preset to a value of 2 to ensure correct initial operation of the system. A signal is supplied to motor 6 to initiate rotation of rod 5 and movement of head 7. Position Indicator Unit 37 then starts to produce a pulse each time the head 7 crosses over a track 9. Unit 37 can include a disc on the rod 5 which cooperates with an electromagnetic or optical system to produce pulses in synchronism with the rotation of rod 5 and the movement of head 7.

The pulses from unit 37 are supplied to decrement Track Counter 31 and to increment Pulse Counter 38 and auxiliary counter 41, the output of which is supplied after modification to increment Changeover Counter 32. Decode Unit 39 produces an output when the count in Pulse Counter 38 is less than 80 and Decode Unit 40 produces an output when the count in Pulse Counter 38 is less than 24. These values 80 and 24 are selected in accordance with the characteristics of the system.

Initially the count in counter 38 is zero and Decode Unit 41 produces an output to AND gate 44 resulting in every 2nd pulse from Indicator Unit 37 being passed through OR gate 42 to AND gate 45. Under the control of timing pulse T a pulse is supplied to increment Changeover Counter 32 and through AND gate 46 to reset auxiliary counter 41. The counting cycle of auxiliary counter 41 is therefore repeated. When the count in Pulse Counter 38 exceeds 24 Decode Unit 39 produces an output to AND gate 45 to cause a pulse corresponding to every fourth pulse from Indicator Unit 37 to Increment Changeover Counter 32. When the count in Pulse Counter 38 exceeds 80 a pulse corresponding to every eighth pulse from Indicator Unit 37 increments Changeover Counter 32. Meanwhile Track Counter 31 is being decremented by each pulse from Indicator Unit 37, and eventually the counts in the two counters 31, 32 are identical and compare unit 33 produces an output to Motor Control Unit 34.

Figure 7:
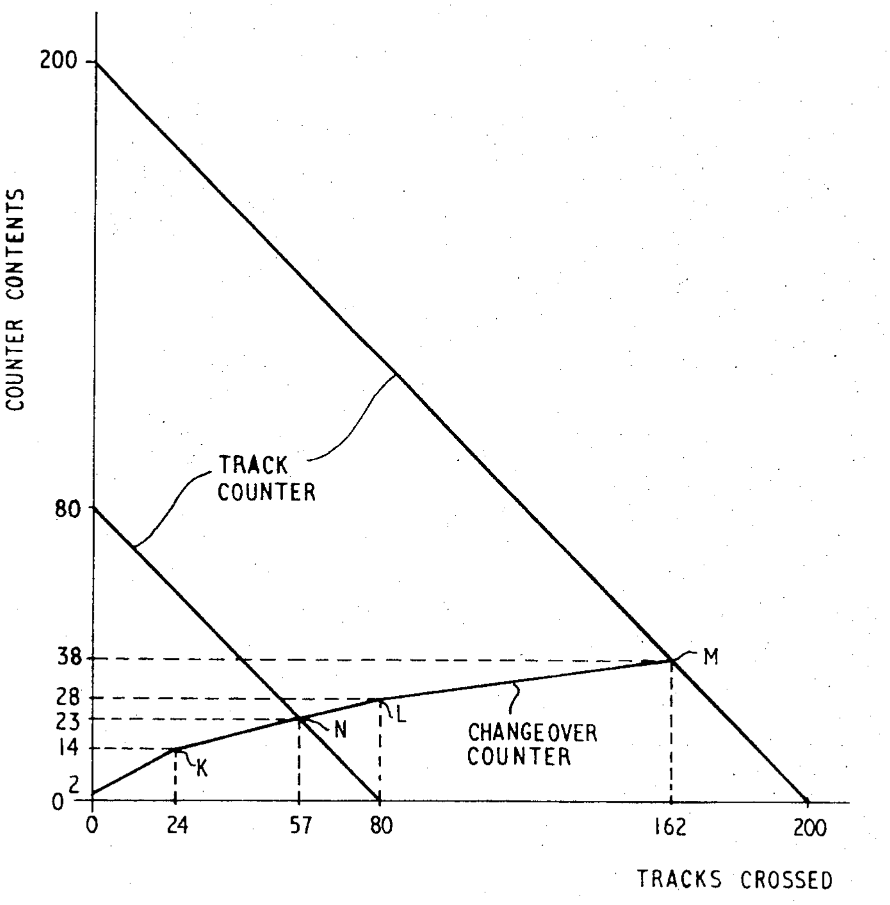
FIG. 7 is a graph illustrating the operation of two of the counters in the system of FIG. 6.

FIG. 7 is a graph illustrating the operation of the system illustrated in FIG. 6. If a signal is initially received from the CPU 35 to move the head 7 across 200 tracks, counter 31 is loaded with 200 and counter 32 preset to 2. Motor 6 starts to rotate rod 5 and Position Indicator Unit 37 produces pulses to decrement Track Counter 31 and to increment Pulse Counter 38 and Auxiliary Counter 41. The system operates to increment Changeover Counter 32 one for every two pulses from Unit 37 until Counter 38 contains 24, point K in FIG. 7. At this stage Changeover Counter 32 will contain 14 ( 2 + 12). From this stage Changeover Counter 32 is incremented one for every four pulses from Unit 37 until Pulse Counter 38 contains 80, point L in FIG. 7. At this stage counter 32 contains 28 (14 + 14). From this stage Counter 32 is incremented one for every eight pulses from Unit 37.

All this time Track Counter 31 is being decremented one for every pulse from Unit 37 and eventually at point M in FIG. 7, the contents of Counter 31 and Counter 32 are equal at 38 (after 162 tracks). At this point Compare Unit 33 produces an output signal to Motor Control Unit 34 to change the motor movement from acceleration to deceleration, point A in FIG. 2.

If the head 7 is to cross only 80 tracks, Track Counter 38 is initially loaded with 80 and the operation described above is commenced. Equality of the contents of Counters 31 and 32 occurs when the counter contain 23, point N in FIG. 7. This point also corresponds to point W in FIG. 2.

Described above are two movement control systems which can be used to provide a control signal to a motor control unit at a particular instant during the movement of the body by the motor to change the movement from acceleration to deceleration to provide the required speed/position characteristics for the movement of the body.

What is claimed is:

1. A movement control system for controlling the movement of a body comprising:

a motor for moving said body into a required position;

a motor control unit for controlling the acceleration and deceleration of said motor;

a position indicator unit for providing a positioning signal for each unit distance of movement of said body;

a calculating unit for initially receiving the number of unit distances said body is to be moved and for continuously receiving said positioning signals, said calculating unit comprising a changeover counter;

a first control means connected to said changeover counter for generating rate signals for stepping said changeover counter, the rate of occurrence of said rate signals being a function of the number of positioning signals received by said calculating unit and the number of unit distances initially received by said calculating unit;

a second control means for generating a deceleration signal when said changeover counter reaches a first predetermined count, said deceleration signal being applied to said motor control unit for initiating the deceleration of said motor.

2. A movement control system as set forth in claim 1 wherein said first control means alters the contents of said changeover counter at a rate which is in a non-linear inverse proportional relationship to the instantaneous number of said unit distances still to be moved by said body, said changeover counter reaching said first predetermined count prior to the time that said body has reached a position represented by said predetermined count.

3. A movement control system as set forth in claim 2 wherein said calculating unit further includes a unit distance counter for initially being set to said number of unit distances said body is to be moved as received by said calculating unit and for being decremented once for each said positioning signal received by said calculating unit.

4. A movement control system as set forth in claim 2 wherein said calculating unit further includes a loading means for setting the initial state of said changeover counter to the initial number of unit distances and said changeover counter is decremented once for each said positioning signal received by said calculating unit and once for each said rate signal received from said first control means.

5. A movement control system as set forth in claim 2 wherein said calculating unit further includes a first detecting means connected between said changeover counter and said second control means for setting said first predetermined count to a value of zero.

6. A movement control system as set forth in claim 4 wherein said calculating unit further includes a first detecting means connected between said changeover counter and said second control means for setting said first predetermined count to a value of zero.

7. A movement control system as set forth in claim 3 wherein said calculating unit further includes a loading means for setting the initial state of said changeover counter to the initial number of unit distances and said changeover counter is decremented once for each said positioning signal received by said calculating unit and once for each said rate signal received from said first control means.

8. A movement control system as set forth in claim 3 wherein said calculating unit further includes a first detecting means connected between said changeover counter and said second control means for setting said first predetermined count to a value of zero.

9. A movement control system as set forth in claim 7 wherein said calculating unit further includes a first detecting means connected between said changeover counter and said second control means for setting said first predetermined count to a value of zero.

10. A movement control system as set forth in claim 4, wherein said calculating unit further comprises a count biasing means connected to said changeover counter for altering the initial state of said changeover counter from the value set in said changeover counter by said loading means.

11. A movement control system as set forth in claim 6 wherein said calculating unit further comprises a count biasing means connected to said changeover counter for altering the initial state of said changeover counter from the value set in said changeover counter by said loading means.

12. A movement control system as set forth in claim 7 wherein said calculating unit further comprises a count biasing means connected to said changeover counter for altering the initial state of said changeover counter from the value set in said changeover counter by said loading means.

13. A movement control system as set forth in claim 9 wherein said calculating unit further comprises a count biasing means connected to said changeover counter for altering the initial state of said changeover counter from the value set in said changeover counter by said loading means.

14. A movement control system as set forth in claim 3 wherein said calculating unit further comprises a third control means for generating a stop signal when the value of said unit distance counter is equal to a second predetermined count, said stop signal being applied to said motor control unit for stopping said motor.

15. A movement control system as set forth in claim 14 wherein said calculating unit further comprises a second detecting means connected between said unit distance counter and said third control means for setting said predetermined count to a value of one.

16. A movement control system as set forth in claim 7 wherein said calculating unit further comprises a third control means for generating a stop signal when the value of said unit distance counter is equal to a second predetermined count, said stop signal being applied to said motor control unit for stopping said motor.

17. A movement control system as set forth in claim 16 wherein said calculating unit further comprises a second detecting means connected between said unit distance counter and said third control means for setting said predetermined count to a value of one.

18. A movement control system as set forth in claim 8 wherein said calculating unit further comprises a third control means for generating a stop signal when the value of said unit distance counter is equal to a second predetermined count, said stop signal being applied to said motor control unit for stopping said motor.

19. A movement control system as set forth in claim 18 wherein said calculating unit further comprises a second detecting means connected between said unit distance counter and said third control means for setting said predetermined count to a value of one.

20. A movement control system as set forth in claim 9 wherein said calculating unit further comprises a third control means for generating a stop signal when the value of said unit distance counter is equal to a second predetermined count, said stop signal being applied to said motor control unit for stopping said motor.

21. A movement control system as set forth in claim 20 wherein said calculating unit further comprises a second detecting means connected between said unit distance counter and said third control means for setting said predetermined count to a value of one.

22. A movement control system as set forth in claim 12 wherein said calculating unit further comprises a third control means for generating a stop signal when the value of said unit distance counter is equal to a second predetermined count, said stop signal being applied to said motor control unit for stopping said motor.

23. A movement control system as set forth in claim 22 wherein said calculating unit further comprises a second detecting means connected between said unit distance counter and said third control means for setting said predetermined count to a value of one.

24. A movement control system as set forth in claim 13 wherein said calculating unit further comprises a third control means for generating a stop signal when the value of said unit distance counter is equal to a second predetermined count, said stop signal being applied to said motor control unit for stopping said motor.

25. A movement control system as set forth in claim 24 wherein said calculating unit further comprises a second detecting means connected between said unit distance counter and said third control means for setting said predetermined count to a value of one.

26. A movement control system as set forth in claim 1 wherein said first control means alters the contents of said changeover counter at a rate which is in a non-linear direct proportional relationship to the instantaneous number of said unit distances already moved by said body, said changeover counter obtaining said first predetermined count, the value of said predetermined count being a function of the magnitude of number of unit distances initially received by said calculating unit.

27. A movement control system as set forth in claim 26 wherein said calculating unit further includes a unit distance counter for initially being set to said number of unit distances said body is to be moved as received by said calculating unit and for being decremented once for each said positioning signal received by said calculating unit.

28. A movement control system as set forth in claim 27 wherein said changeover counter is incremented once for each said rate pulse received by said changeover counter from said first control means.

29. A movement control system as set forth in claim 28 wherein said second control means comprises a comparator for comparing the contents of said changeover counter and said unit distance counter, said second control means generating said deceleration signal when said comparator indicates that the contents of said changeover counter and said unit distance counter are equal to one another.

* * * * *